US007070681B2

(12) United States Patent
Santiago et al.

(10) Patent No.: US 7,070,681 B2
(45) Date of Patent: Jul. 4, 2006

(54) ELECTROKINETIC INSTABILITY MICROMIXER

(75) Inventors: Juan G. Santiago, Fremont, CA (US); Michael H. Oddy, San Francisco, CA (US); James C. Mikkelsen, Jr., Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 184 days.

(21) Appl. No.: 10/056,944

(22) Filed: Jan. 24, 2002

(65) Prior Publication Data

US 2002/0125134 A1 Sep. 12, 2002

Related U.S. Application Data

(60) Provisional application No. 60/264,234, filed on Jan. 24, 2001.

(51) Int. Cl.
*G01N 27/26* (2006.01)
*G01N 27/447* (2006.01)

(52) U.S. Cl. ...................... 204/451; 204/454; 204/547; 204/601; 204/643; 137/896

(58) Field of Classification Search ........ 204/450–455, 204/600–605, 547, 643; 137/896
See application file for complete search history.

(56) References Cited

U.S. PATENT DOCUMENTS

| | | | | |
|---|---|---|---|---|
| 2,949,550 A | | 8/1960 | Brown et al. | 310/5 |
| 5,304,487 A | * | 4/1994 | Wilding et al. | 435/29 |
| RE35,102 E | * | 11/1995 | Zare et al. | 204/453 |
| 5,716,852 A | * | 2/1998 | Yager et al. | 436/172 |
| 5,785,831 A | * | 7/1998 | Bek | 204/451 |
| 6,012,902 A | * | 1/2000 | Parce | 417/48 |
| 6,033,546 A | | 3/2000 | Ramsey | 204/603 |
| 6,046,056 A | | 4/2000 | Parce et al. | 436/514 |
| 6,082,891 A | | 7/2000 | Schubert et al. | 366/338 |
| 6,086,243 A | | 7/2000 | Paul et al. | 366/273 |
| 6,111,096 A | * | 8/2000 | Laugharn et al. | 204/601 |
| 6,158,712 A | | 12/2000 | Craig | 251/61.1 |
| 6,174,675 B1 | | 1/2001 | Chow et al. | 435/6 |
| 6,176,962 B1 | | 1/2001 | Soane et al. | 156/292 |

(Continued)

OTHER PUBLICATIONS

A. Manz et al, "Electroosmotic pumping and electrophoretic separations for miniaturized chemical analysis systems." J. Micromech. Microeng. 4, 257-265. (Dec. 1994).*

(Continued)

*Primary Examiner*—Alan Diamond
*Assistant Examiner*—Jeffrey Barton
(74) *Attorney, Agent, or Firm*—Lumen Intellectual Property Services, Inc.

(57) ABSTRACT

A novel electrokinetic instability (EKI) micromixer and method takes advantage of the EKI to effect active rapid stirring of confluent microstreams of biomolecules without moving parts or complex microfabrication processes. The EKI is induced using an alternating current (A/C) electric field. Within seconds, the randomly fluctuating, three-dimensional velocity field created by the EKI rapidly and effectively stirs an initially heterogeneous solution and generates a homogeneous solution that is useful in a variety of biochemical and bioanalytical systems. Microfabricated on a glass substrate, the inventive EKI micromixer can be easily and advantageously integrated in molecular diagnostics apparatuses and systems, such as a chip-based "Lab-on-a-Chip" microfluidic device.

26 Claims, 8 Drawing Sheets

200

U.S. PATENT DOCUMENTS

| | | | | |
|---|---|---|---|---|
| 6,210,986 | B1 | 4/2001 | Arnold et al. | 438/42 |
| 6,213,151 | B1 | 4/2001 | Jacobson et al. | 137/827 |
| 6,221,226 | B1 | 4/2001 | Kopf-Sill | 204/602 |
| 6,235,175 | B1 | 5/2001 | Dubrow et al. | 204/453 |
| 6,235,471 | B1 | 5/2001 | Knapp et al. | 435/6 |
| 6,241,379 | B1 | 6/2001 | Larsen | 366/181.5 |
| 6,287,440 | B1 * | 9/2001 | Arnold et al. | 204/450 |
| 6,306,273 | B1 | 10/2001 | Wainright et al. | 204/454 |
| 6,337,740 | B1 | 1/2002 | Parce | 356/344 |
| 2002/0023841 | A1 * | 2/2002 | Ahn et al. | 204/547 |

OTHER PUBLICATIONS

M. H. Oddy et al.; "Electokinetic instability micromixing;" Analytical Chemistry, vol. 73, No. 24, Dec. 15, 2001, pp. 5822-5832.

J. G. Santiago; "Electroosmotic flows in microchannels with finite inertial and pressure forces;" Analytical Chemistry, vol. 73, No. 10, May 15, 2001, pp. 2353-2365.

Yi-Kuen Lee et al.; "Chaotic mixing in electrokinetically and pressure driven micro flows;" The 14th IEEE Workshop on MEMS Interlaken, Switzerland, Jan. 2001.

Pavlo Takhistov et al.; "Electrokinetic displacement of air bubbles in microchannels;" Jan. 29, 2001.

Jorg P. Kutter; "Current developments on electrophoretic and chromatographic separation methods on microfabricated devices;" trends on analytical chemistry, vol. 19, No. 6, 2000.

Robin H. Liu et al.; "Passive mixing in a three-dimensional serpentine microchannel;" Journal of Microelectromechanical Systems, vol. 9. No. 2, Jun. 2000.

Giles Hl Wl Sanders et al.; "Chip-based microsystems for genomic and proteomic analysis;" trends on analytical chemistry, vol. 19, No. 6, 2000.

Stephen C. Jacobson; "Microfluidic devices for electrokineticall parallel and serial mixing;" Analytical Chemistry, vol. 71, No. 20, Oct. 15, 1999, pp. 4455-4459.

M Koch et al.; "Two simple micromixers based on silicon;" J. Micomech. Microeng. 8 (1998) 123-126. Printed in the UK.

Dorian Liepmann et al.; "Micro-fluidic mixer;" Liepmann D.; Evans J. D. Polym. Mater. Sci. Eng. Proc. ACS Div. Polym. Mater. Sci. Eng. 1997, 76, pp. 549-550 Citation.

Norbert Schwesinger et al.; "A modular microfluid system with an integrated micromixer;" J. Micomech. Microeng. 6 (1996) 99-102. Printed in the UK.

J. Michael Ramsey et al.; "Microfabricated chemical measurement systems;" Nature Medicine, vol. 1, No. 10, Oct. 1995.

M Elwenspoek; "Towards integrated microliquid handling systems;" J. Micomech. Microeng. 4 (1994) 227-245. Printed in the UK.

J. M. Schneider et al.; "Electrohydrodynamic stability of space-charge-limited currents in dielectric liquids. I. Theoretical study;" The Physics of Fluids, vol. 13, No. 8, Aug. 1970.

J. R. Melcher et al.; "Electrohydrodynamics: a review of the role of interfacial shear stresses;" Melcher, J. R. :Tayler, G. I. Annu. Rev. Fluid Mech. 1969, I. 111-146.

Emilij K. Zholkovskij et al.; "Electokinetic instability of solution in a plane-parallel electrochemical cell;" Journal of Colloid and Interface Science 181, 28-33 (1996).

Kurt Seller et al.; "Electroosmotic pumping and valveless control of fluid flow within a manifold of capillaries on a glass chip;" Anal. Chem. Vol. 66, No. 20, Oct. 15, 1994, 3485-3491.

Jonathan Knight, "Honey, I shrunk the lab," Nature/vol. 418 Aug. 1, 2002, pp. 474-475.

Chuan-Hua Chen et al., "Convective and absolute electrokinetic instability with conductivity gradients," J. Fluid Mech. (2005), vol. 524, pp. 263-303.

Michael H. Oddy et al., "A Multiple-Species Model for Electrokinetic Instability," Department of Mechanical Engineering, Stanford University, pp. 1-57.

* cited by examiner

ELECTROKINETIC INSTABILITY MICROMIXER

CROSS-REFERENCES TO RELATED APPLICATIONS

This application claims the benefit of U.S. Provisional Application No. 60/264,234, filed on Jan. 24, 2001, which is hereby incorporated herein by reference in its entirety.

STATEMENT REGARDING FEDERALLY SPONSORED RESEARCH OR DEVELOPMENT

This invention is supported in part by the Defense Advanced Research Projects Agency (DARPA) Grant F33615-98-2853 and Grant F30602 00 2-0609. The U.S. Government has certain rights in the invention.

BACKGROUND OF THE INVENTION

1. Field of the Invention

This invention relates generally to microfluidic devices and systems. More particularly, it relates to a novel electrokinetic instability micromixer and method for rapid mixing of small volume liquid solutions for microfluidic bioanalytical devices and systems.

2. Description of the Related Art

Microfluidic devices that perform various chip-based chemical and biological analyses have received significant attention over the past decade. As device scales decrease below 1 mm or 500 micron, miniaturization and integration of traditional chemical and biochemical laboratory analysis devices onto credit card-sized "Lab-on-a-Chip" systems offer the potential for higher throughput by way of parallelization, shorter analysis times, reduced sample volumes, in situ operation, and reduced operation and manufacturing costs. The "Lab-on-a-Chip" technology is anticipated to have a significant impact on the fields of genomics, proteomics, clinical analysis and basic biomolecular research.

Such miniaturization and integration require careful design considerations. One important consideration is the rapid, homogeneous mixing of biological and biochemical solutions or reagents that often have relatively low diffusion coefficients. Rapid mixing is crucial in microfluidic systems for biochemistry analysis, drug delivery, sequencing or synthesis of nucleic acids, among others.

Rapid homogeneous mixing becomes increasingly important when the time scale associated with mixing is larger or of the same order as a chemical reaction time scale. Rapid mixing is difficult or inefficient in microfluidic devices and systems due to the characteristically low Reynolds number (Re) of microflows and the relatively low diffusion coefficients of the solutions to be stirred, particularly if the solutions contain macromolecules. In other words, the low Reynolds number (on the order of 0.1) associated with microfluidic devices precludes turbulence as a viable stirring mechanism. Since rapid stirring is essential for many biochemical assays and bioanalytical techniques, such as immunoassays and hybridization analyses, this presents a significant challenge to chip-based molecular diagnostics.

In small scale devices, low Reynolds number (Re) flow fields can result in mixing processes on the order of tens of seconds or greater. This is particularly true of solution streams containing macromolecules (e.g., globular proteins) whose diffusion coefficients are 1–2 orders of magnitude lower than that of most liquids. For example, the diffusive transport of hemoglobin across a 200 μm buffer stream can be on the order of 400 s.

Various micromixing schemes and devices have been developed in the art. Note "mixer" and "micromixer" are used interchangeably herein to refer to a micro-scale mixing apparatus. Similarly, "fabrication" and "microfabrication" are used interchangeably herein to refer to micro-scale fabrication. In general, a solution is mixed or homogeneous once gradients in the concentration have been eliminated. The fluid flow associated with micro-bioanalytical system is typically dominated by viscous forces and the fluid flow is therefore laminar.

In laminar flow, the reduction of gradients in concentration is usually dominated by simple molecular diffusion. Consequently, present micromixers rely on diffusion as the main mechanism for mixing. The diffusion time ($t_D$) dependence on diffusion length ($L_D$) can be approximated by the well known relationship, $$t_D \approx \frac{L_D^2}{D},$$

where D is the diffusion coefficient.

A reduction in the mixing time for a solution of a given diffusion coefficient requires a reduction in the diffusion length. Accordingly, rapid micromixers are typically designed to stretch materials lines (boundaries) between two streams and to decrease the length over which diffusion occurs.

There are several known mixing schemes in the art that offer diffusion length reduction, including lamination mixing, micro-plume injection, pressure-driven chaotic advection, and parallel/serial mixing.

Lamination mixing essentially offers a technique for increasing the interfacial area between the liquids to be mixed as well as reducing diffusion length by sequentially splitting and stacking fluid layers. Although this offers an effective mixing method, the lamination mixer comprises a three-dimensional (3D) geometry, which presents costly microfabrication challenges. Lamination mixers also require significant flow channel area in order to have enough cycles. Lamination mixers are discussed in further details with respect to out-of-plane mixers hereinafter. Exemplary teachings on lamination mixing method and device can be found in "Microfluidic Devices for Electrokinetically Parallel and Serial Mixing", *Anal. Chem.* 1999, 71, 4455–4459, by Jacobson et al. and in U.S. Pat. No. 6,213,151 B1, titled "MICROFLUIDIC CIRCUIT DESIGNS FOR PERFORMING FLUIDIC MANIPULATIONS THAT REDUCE THE NUMBER OF PUMPING SOURCES AND FLUID RESERVOIRS", issued to Jacobson et al. of Knoxville, Tenn., and assigned to UT-Battelle of Oak Ridge, Tenn., USA (hereinafter referred to as "Jacobson et al.").

Microplume injection reduces the diffusion length required to mix by injecting fluid stream A into stream B through a large array of micronozzles. The fluid emanates from the micronozzles in the form of microplumes that slowly disperse throughout the fluid. Microplume injection like lamination mixing has inherent disadvantages due to the complexity of their microfabrication. The homogeneity of the mixture is proportional to the area density of the micronozzles. A grid of micronozzles with a very fine pitch poses obvious microfabrication difficulties. Exemplary teachings on microplume injection can be found in "Towards integrated microliquid handling systems", *J. MicroMech. Microeng.* 1994, 4, 227–245, by Elwenspoek et al. (hereinafter referred to as "Elwenspoek et al.").

Chaotic mixing through the use of forcing jets has been suggested and simulated for microfluidic systems. Another scheme that has been co-developed by co-inventor J.G. Santiago involves a method for mixing two streams that takes advantage of chaotic advection. However, in order to take such advantage, a complex three dimensional (3D) geometry is required to create the complex advection flow. The resulting mixer thus requires a more complex fabrication scheme, which is a common problem with many prior art mixers. Related exemplary teachings can be found in "Chaotic Mixing in Electrokinetically and Pressure Driven Micro Flows", *Proc. 14th IEEE Workshop MEMS* 2001, 483–486, by Lee et al. (hereinafter referred to as "Lee et al.") and "Passive Mixing in a Three-Dimensional Serpentine Microchannel", *J. Microelectromech. Syst.* 2000, 9, 190–197, by Liu et al. (hereinafter referred to as "Liu et al.").

The problem of space associated with lamination mixers is also a problem for the simple parallel/serial mixing method and devices such as those disclosed by Jacobson et al. Such mixers require rather long channels in order to allow for sufficient diffusion of the solution. The size or footprint of the device is therefore a major design hurdle. Large footprints defeat the purposes of miniaturization and portability.

Micromixing devices that utilize these mixing schemes will be discussed next. Generally, most micromixers can be classified by their respective underlying mixing scheme as either active or passive. Passive stirring schemes include previously discussed simple in-plane, lamination, and chaotic advection stirring. Passive mixers typically use channel geometry to increase the interfacial area between the liquids to be mixed. These mixers can be categorized into two subclasses: in-plane mixers, which divide and mix streams within a fluid network confined to one level, i.e., a pattern that can be projected onto a single plane, and out-of-plane or lamination mixers, which use three-dimensional channel geometries.

The simplest in-plane micromixers merge two fluid streams into a single channel and accomplish mixing by molecular diffusion. More elaborate in-plane micromixers include those disclosed by Jacobson et al. and by Koch et al. in "Two Simple Micromixers Based on Silicon", *J. Micromech. Microeng.* 1998, 8, 123–126.

Out-of-plane, lamination mixers can sequentially split and stack fluid streams in a three-dimensional fluidic network. Exemplary teachings can be found in "A modular Microfluid System with an Integrated Micromixer," *J. Micromech. Microeng.* 1996, 6, 99–102, by Schwessinger et al., and in U.S. Pat. No. 6,241,379 B1, titled "MICROMIXER HAVING A MIXING CHAMBER FOR MIXING TWO LIQUIDS THROUGH THE USE OF LAMINAR FLOW", issued to Larsen of Holte, DK, and assigned to Danfoss A/S of Nordborg, DE. Such mixers can achieve exponential growth of stream to stream interfacial area for multiple split-and-stack cycles. Microplume array injection disclosed by Elwenspoek et al. is another out-of-plane mixer.

The third type of passive mixer is a chaotic advection micromixer which takes advantage of rapid stretching and folding of material lines associated with pressure-driven chaotic advection, such as one disclosed by Liu et al. Lamination mixers typically need multilayer microfabrication techniques, which make them less attractive to bioanalysis system designers. This is particularly true for electrokinetic systems where one- or perhaps two-layer fabrication is the norm.

Active mixers typically have moving parts or externally applied forcing functions such as pressure or electric field. A few active micromixers have been demonstrated. One is presented by Liepmann et al. in "Micro-Fluidic Mixer", *Polym. Mater. Sci. Eng. Proc. ACS Div. Polym. Mater. Sci. Eng.* 1997, 76, 549–550, where a mixing chamber is designed to effect fluid stirring using microfabricated valves and phase-change liquid micropumps. Another active mixer currently being developed by Lee et al. is a field-driven, silicon microfabricated mixer that takes advantage of dielectrophoresis to stir material in the mixer. Pressure disturbances have also been added to microchannel flows to induce rapid stirring. Although active mixers with moving parts are effective, they are often difficult to fabricate and control and are mostly suited for silicon substrates only.

U.S. Pat. No. 6,086,243, titled "ELECTROKINETIC MICRO-FLUID MIXER", issued to Paul et al. of Fremont, Calif., and assigned to Sandia Corp. of Albuquerque, N. Mex., disclosed a method and apparatus for efficiently and rapidly mixing liquids in a system operating in the creeping flow regime such as would be encountered in capillary-based systems, those systems in which the thickness of the system is small compared to its width. According to Paul et al., by applying an electric field to each liquid, the mixer is capable of mixing together fluid streams in capillary-based systems, where mechanical or turbulent stirring cannot be used, to produce a homogeneous liquid.

Specifically, a static electric field is applied to each liquid, thereby inducing electroosmotic flow in each, the liquids being in contact with one another. By appropriately choosing the value of the static electric field, each liquid can be induced to create a zone of recirculation, thereby stirring the liquid and creating interfacial area to promote molecular mixing.

There is a continuing need in the art for a more efficient micromixer that takes advantage of an efficient low Reynolds number stirring mechanism. What is also needed is a novel mixing mechanism that be easily implemented into an active micromixer with smaller footprint, fewer components, and without moving parts. The novel mixing mechanism takes advantage of fluctuating electric fields to effect rapid mixing efficiently and effectively with easy integration and low fabrication cost, thereby enabling Lab-on-a-Chip bioanalytical microfluidic devices and systems.

BRIEF SUMMARY OF THE INVENTION

It is therefore a primary object of the present invention to provide a novel electrokinetic instability (EKI) micromixer and method that takes advantage of a fluctuating electric field to effect rapid stirring of confluent microstreams of biomolecules without moving parts, wherein the EKI, induced via an alternating current (A/C) electric field, generates a randomly fluctuating, three-dimensional velocity field that actively, rapidly, and effectively stirs the solution, thereby generating a homogeneous solution useful in a variety of biochemical and bioanalytical systems.

It is also an object of the present invention to provide a novel electrokinetic stirring method for rapid mixing of an initially heterogeneous solution whose motion is dominated by viscous forces, the method comprising an act of inducing an EKI in the initially heterogeneous solution via an A/C excitation such that the EKI, generated within a few seconds after application of the A/C electric field and acting as an active stirring means, quickly produces a randomly fluctuating, three-dimensional fluid flow field enabling the rapid mixing, thereby generating a homogeneous solution from the initially heterogeneous solution.

It is another object of the present invention to provide a novel EKI micromixer comprising a sealed fluidic network having a mixing chamber, a plurality of externally accessible ports, a plurality of simple, straight liquid channels connecting the mixing chamber and the ports, such that, during operation of the EKI micromixer, an A/C excitation, applied to the fluidic network via electrodes positioned in the ports, induces an EKI in the mixing chamber to effect rapid mixing of an initially heterogeneous solution confined therein.

It is yet another object of the present invention to incorporate high flow resistance, porous, dielectric frits for mechanically isolating fluids in the mixing chamber while providing an ionic connection so that the rapid mixing can be achieved without the disturbances of fluid motions and electrolysis gases.

It is a further object of the present invention to provide a low cost and simple microfabrication method for producing a compact and robust EKI micromixer on a glass substrate such that the novel EKI micromixer can be easily and advantageously integrated into exisiting microfluidic bioanalytical apparatuses and systems such as a chip-based “Lab-on-a-Chip” microfluidic device.

It is thus an object of the present invention to provide a microfabrication method comprising the steps of deep wet-etching on a first glass substrate a microfluidic network having a mixing chamber, a plurality of ports, and a plurality of liquid microchannels connecting the mixing chamber and the ports, drilling corresponding thru-holes through a second glass substrate, and sealing the fluidic network by thermally bonding the second glass substrate to the first glass, such that fluids introduced into the microfluidic network are advected either electroosmotically or with pressure toward the mixing chamber, and that an A/C excitation can be directed into the EKI micromixer to induce an EKI in the mixing chamber during operation of the EKI micromixer to effect the rapid mixing.

Still further objects and advantages of the present invention will become apparent to one of ordinary skill in the art upon reading and understanding the following drawings and detailed description discussed herein. As it will be appreciated by one of ordinary skill in the art, the present invention may take various forms and may comprise various components, steps and arrangements thereof. Accordingly, the drawings are for purposes of illustrating principles and embodiments of the present invention and are not to be construed as limiting the present invention.

DETAILED DESCRIPTION OF THE INVENTION

Figure 1:
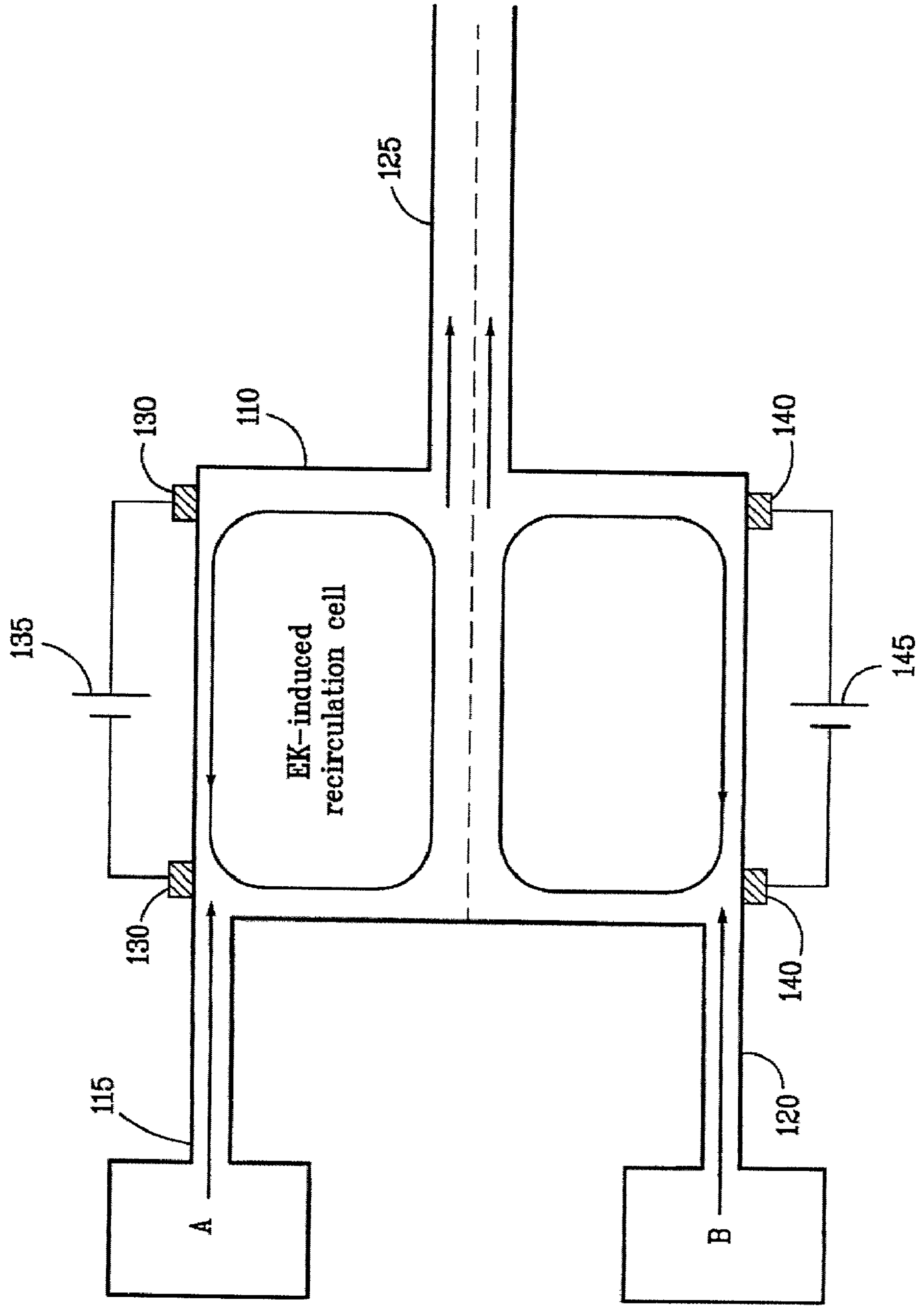
FIG. 1 (PRIOR ART)
FIG. 1 shows a prior art micromixer.

FIG. 1 illustrates a prior art electrokinetic micro-fluid mixer. A chamber 110 is provided with liquid inlets 115 and 120 which can lead from reservoirs A and B and serve to introduce liquids from the reservoirs into chamber 110 and a single fluid outlet 125 which receives the liquid output from chamber 110 and directs it elsewhere. At least a portion of the chamber 110 is constructed using a dielectric material, such as silica or alumina, whose conductivity is less than that of the introduced liquids and will support electroosmotic flow.

The dielectric portion of chamber 110 is fitted with pairs of spaced electrodes, such as 130 and 140. Each pair of spaced electrodes is in contact with one liquid and is respectively connected to a direct current (D/C) power supply 135 and 145. The magnitude of the velocity of flow of fluids in chamber 110 is controlled by the DC power supply 135 and 145.

As described above, an electric double layer is created in a liquid, and particularly an electrolyte, in contact with the dielectric material of chamber 110. The presence of the applied electric field, such as that produced by the pairs of spaced electrodes 130 and 140, induces a force on the liquid double layer that causes motion of the liquids contained in chamber 110 along the chamber walls. In the absence of any net flow through chamber 110, the liquids are caused to recirculate within their respective portion of the chamber. The recirculation of the respective liquids produces repeated laminar folding that increases the interfacial area of each liquid such that diffusion of each liquid into the other takes place rapidly and leads to the formation of a homogeneous mixture.

It is important to note that, in this prior art scheme, the recirculation of the respective liquids serves as the mixing mechanism. The pair of D/C power supplies 135 and 145 respectively provides electrons that stream in one direction to facilitate motion. In other words, with electrons moving in one direction only this mixer does not take the many advantages from an alternating current (A/C) electric field. In addition, at least a portion of chamber 110 must be dielectric and fitted with pairs of spaced electrodes 130 and 140. In this case, more elaborate fabrication processes would be required and the mixer may not be easily integrated into existing microfluidic bioanalytical devices and systems.

The present invention provides a novel electrokinetic instability (EKI) micromixer that takes advantage of an EKI induced by an alternating current (A/C) electric field to effect rapid stirring. Principles and applications of alternating current and electrokinetics are known in the art and thus will not be further described herein for the sake of brevity. For related teachings on alternating current electrokinetics and a simple treatment of the stable, base state for an oscillating, electroosmotic flow in a two-dimensional microchannel, preliminary experimental observation on electrokinetic instability, as well as preliminary quantification of the performance of the EKI micromixers disclosed herein, readers are directed to our recent publication, "Electrokinetic Instability Micromixing", *Analytical Chemistry*, Vol. 73, No. 24, Dec. 2001, 5822–5832, which is hereby expressly incorporated herein by reference in its entirety.

According to an aspect of the present invention, a novel electrokinetic process is provided for rapid stirring of micro- and nanoliter volume solutions useful for microfluidic bioanalytical applications. According to the principles of the present invention, rapid stirring of microflow streams is achieved by initiating a flow instability, which has been observed in sinusoidally oscillating, electroosmotic channel flows. As the effect occurs within an oscillating electroosmotic flow, it is thus referred to herein as an electrokinetic instability (EKI). The rapid stretching and folding of material lines associated with this instability can be used to stir fluid streams with Reynolds numbers of order unity, based on channel depth and rms electroosmotic velocity.

Electroosmotic flow takes advantage of the spontaneous separation of charge generated at a liquid/solid interface, called the electric double layer (EDL). The thickness of the diffuse ion region of the EDL is on the order of the Debye length, $\lambda_D$, of the solution and the potential drop across this region is called the zeta potential, $\zeta$. Externally applied electric fields exert a force on the region of net charge, and the ions, in turn, impart a drag force on the bulk fluid. For $\lambda_D$, much smaller than a characteristic channel dimension, as in the case of the present invention, the fluid dynamics of the bulk liquid outside of the EDL are well-modeled by a slip velocity boundary condition. This slip velocity is directly proportional to the applied electric field and the local $\zeta$ potential.

This slip velocity approximation well describes the flow outside of the EDL for applied field frequencies of less than ~1 MHz and buffer chemistries typical of electrokinetic bioanalytical Microsystems. For related teachings on electroosmotic flows, readers are directed to co-inventor J. G. Santiago's recent publication, "Electroosmotic Flows in Microchannels with Finite Inertial and Pressure Forces", *Analytical Chemistry*, Vol. 73, No. 10, May 2001, 2353–2365, which is hereby incorporated herein by reference in its entirety.

According to an aspect of the invention, the EKI can be observed in a steadily oscillating electroosmotic flow channel seeded with submicrometer, fluorescent particles. The system comprises a simple rectangular borosilicate capillary of 100 μm×1 mm inside dimension and a length of 40 mm. The capillary is filled with deionized water and seeded with 490-nm tagged fluorescent polystyrene particles. Particle streaks are imaged using an epifluorescent microscope at 60× magnification.

A cooled CCD camera is used for the image recording. A sinusoidally alternating electric field is applied to the test cell through platinum electrodes introduced into wells (130 μL) at either end of the capillary. The applied voltage is varied from 1 to 8 kV and the frequency is 20 Hz. A surface profile of the channel walls using a profilometer indicates that the surface roughness in on the order of 50 nm, or less than 0.1% of the channel depth.

The electric field in this high-aspect ratio, uniform conductivity system is expected to be one-dimensional and to vary sinusoidally in time, yet seed particles have been observed to exhibit two- and three dimensional motions at electric field strengths above 100 V/mm. The initially uniaxial stable base flow in this system led to apparently random and transverse velocity fluctuations of the seed particles. The departure at higher electric field strengths of the one dimensional particle path lines to three-dimensional path lines, with displacements having components transverse to the applied electric field, indicates that the observed phenomenon is a flow instability.

It is well known in the art that mixing can be divided into two processes: stirring and diffusion. Stirring is a mechanical process, resulting in a redistribution of material such that the net intermaterial area increases. As such, stirring is purely kinematical and dependent only on flow parameters. Diffusion, resulting from random molecular motion, is a material homogenization process on the molecular scale and depends on thermophysical properties such as diffusivity. Stirring enhances mixing, in that it increases the contact area between the streams to be mixed, thereby reducing the necessary diffusion length required for two substances to molecularly diffuse.

Mixing and mixer performance have been studied using dilution and chemical reaction techniques. Rather than invasively probing the flow directly, the concentration field is inferred through fluorescence intensity fields generated from either the dilution or chemical reaction techniques. In a typical dilution experiment, a dyed fluid, consisting of a passive scalar of known concentration, is mixed with an undyed fluid. Note that the data provided by dilution techniques should be carefully interpreted, as the data may overpredict the amount of mixing, due to biasing associated with the finite spatial resolution of the imaging system. Here a dilution technique is applied in order to document the existence of the EKI and to provide a preliminary quantification of the performance of the inventive EKI micromixers.

Another method of quantifying mixing is through a chemical reaction experiment, which usually uses a fast, irreversible chemical reaction of the type A+B→P, where reactants A and B are mixed to form product P. The yield of product P is a direct measurement of the amount of mixing, since the chemical reaction only proceeds once species A and B have molecularly diffused.

Typically, the chemical reaction experiment is performed with an acid-base reaction and a dye having a fluorescence quantum yield that is pH dependent, such as fluorescein. The dilution is the preferred mixing qualification technique because it avoids the high pH gradients associated with most reaction experiments. Since electroosmotic mobility (e.g., ζ potential) is a strong function of pH, an EKI micromixer flow field with strong pH gradients is expected to behave significantly different from a homogeneous fluid case.

For imaging analyses, two-dimensional, line-of-sight averaged spatial intensity fields are used to provide a near-instantaneous line-of-sight integration of fluorophores within each imaged voxel. The images are obtained with a spatial resolution of 2.7×2.7 μm in the object plane. A natural metric for quantifying the state of mixedness is the two-dimensional standard deviation of a fluorescence, intensity image obtained from a dilution experiment. As the standard deviation of scalar intensity tends to zero, so would any concentration gradients. However, a well-stirred flow stream can have an arbitrarily high or low standard deviation if molecular diffusion is negligible and the scale of stirring is optically resolved. Therefore, spatial probability density functions (PDFs) of intensities integrated over finite voxel regions are preferably utilized to quantify mixing to within the length scales of the voxels.

As an example, consider two black and white checkerboard spatial intensity distributions having fine and coarse pitches, i.e., two differently "stirred" distributions subject to zero diffusion. These distributions will have identical values for the standard deviation. However, if the intensity distributions are voxel- (or pixel-) averaged over finite regions larger than the smaller of the two pitches (but smaller than the larger pitch), the averaging operation will take into account equal amounts of black and white regions in the fine pitch case, resulting in a unimodal PDF. The voxel-averaged coarse pitch distribution will remain bimodal. PDFs can therefore provide an effective means for interpreting the quality of "mixedness" to within the scale of the voxel.

Power spectra have also been used to quantify the state of mixedness. Power spectra display the spectral content of the image intensity fields. Energy at high spatial frequencies indicates well-resolved dilution images of rapid stirring with little molecular diffusion (or a relatively small amount of unresolved, subpixel stirring). Low-frequency components of image power spectra are associated with both unresolved stirring, i.e., to within the length scales of the line-of-sight integrated images, and well-diffused concentration fields.

According to another aspect of the present invention, the designs and fabrication processes of the inventive EKI micromixing devices are also provided. The novel EKI micromixers are capable of rapidly stirring fluid streams using the EKI phenomenon disclosed herein. A high-resolution CCD camera is used to record the stirring and diffusion of fluorescein from an initially unmixed, heterogeneous configuration. Integration of fluorescence intensity over measurement volumes (voxels) provides a measure of the degree to which two streams are mixed to within the length scales of the voxels. Ensemble-averaged probability density functions and power spectra of the instantaneous spatial intensity profiles are used to quantify the mixing processes. Two-dimensional spectral bandwidths of the mixing images are initially anisotropic for the unmixed configuration, broaden as the stirring associated with the EKI rapidly stretches and folds material lines (adding high spatial frequencies to the concentration field), and then narrow to a relatively isotropic spectrum at the well-mixed, homogeneous conditions.

Figure 2:
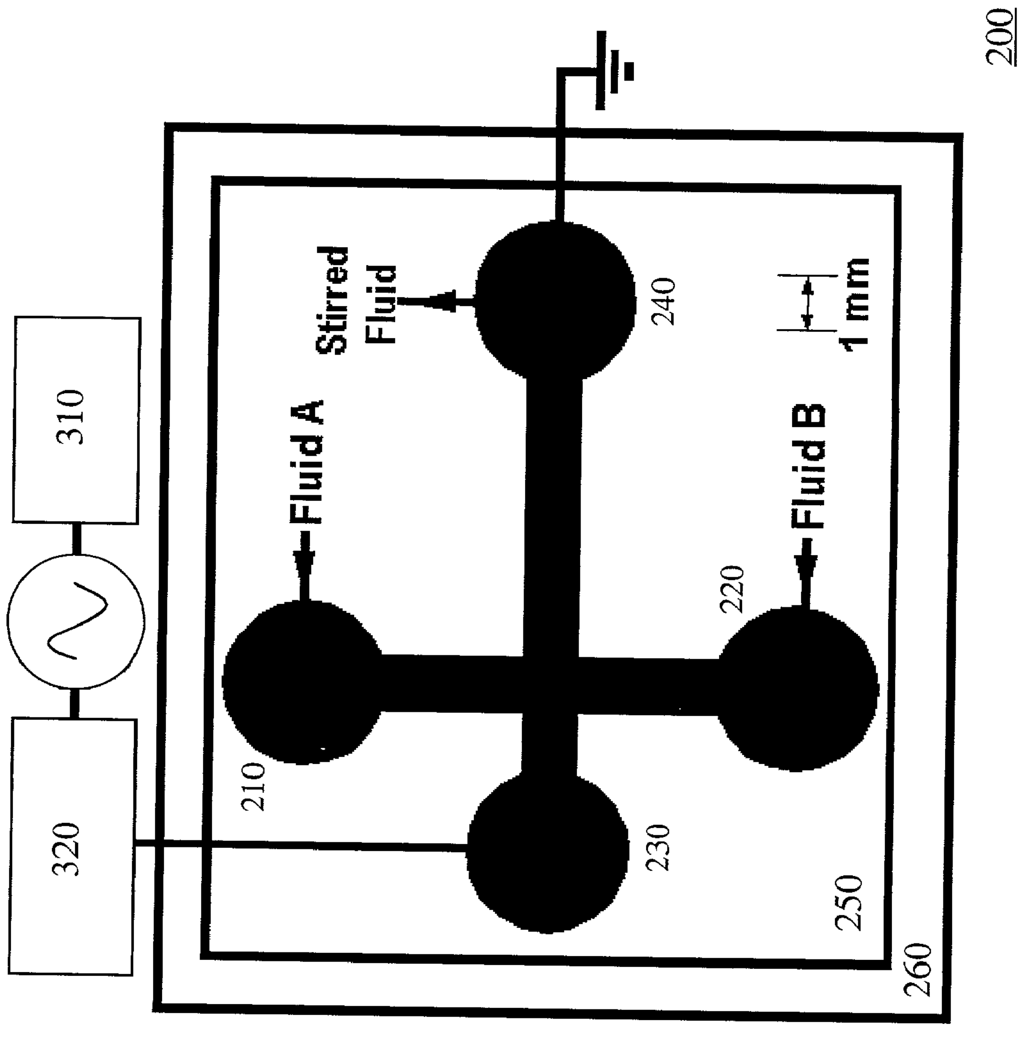
FIG. 2 illustrates a first embodiment of the present invention.

FIG. 2 schematically shows a first embodiment of an EKI micromixer 200 in a T-mixer configuration. The channels have a nominal width and depth of 1 mm and 300 μm, respectively, and can be cast in PDMS 250 (Polydimethylsiloxane, known as Sylgard 384). The PDMS mixture is first degassed in a vacuum chamber for one hour and then poured over a mold of the network assembled using rectangular borosilicate glass capillaries and epoxy. After curing at 80° C., the channels are sealed with a glass cover slide 260. Fluids A and B are introduced into the input ports 210 and 220. The fluids are pumped through the system using a simple 2 mm hydrostatic pressure head (not shown). Platinum electrodes (not shown) introduced into the upstream and downstream reservoirs 230 and 240 provided an A/C excitation. The EKI occurs along the entire channel.

Figure 3:
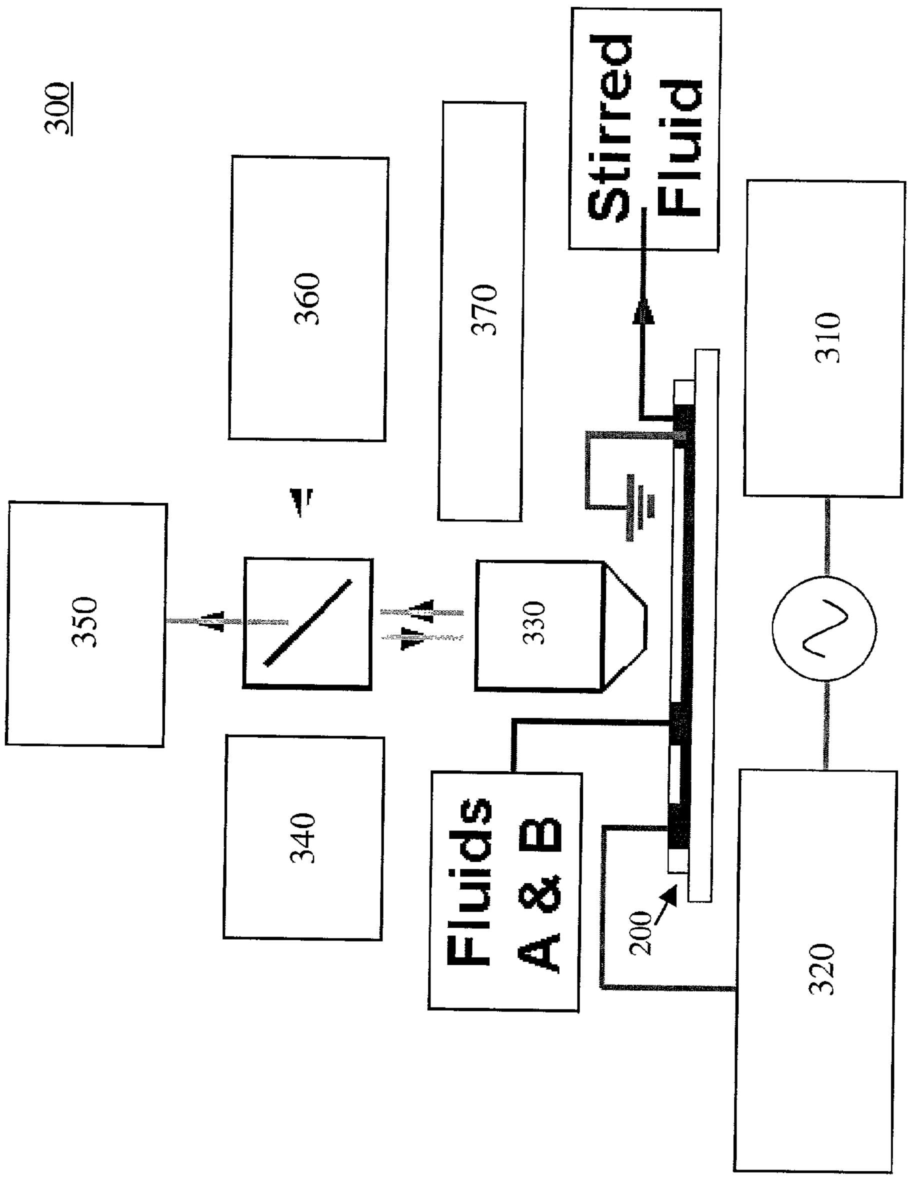
FIG. 3 is a schematic of a system set up according to an aspect of the present invention.

FIG. 3 illustrates a system 300 for monitoring and analyzing the performance of the EKI micromixer 200. As can be seen in FIG. 3, a function generator 310 coupled with a high-voltage amplifier 320 provided the A/C field excitation to platinum electrodes (not shown). In an embodiment, the frequency and applied voltage are 10 Hz and 1 kV, respectively. The electrode spacing is 9 mm. The working fluid is a 2 mM borate buffer dyed with an order 10 μM solution of 2-MDa dextran/fluorescein conjugate. In all dye visualization techniques discussed herein, working fluids are filtered with 0.45-μm pore filters (not shown) prior to their use.

According to FIG. 3, an upright microscope 330 equipped for epifluorescence is used to view the flow field with an objective 370. Illumination from a 100-W mercury lamp 360 is spectrally filtered at the peak fluorescein absorption and emission wavelengths of 485 and 535 nm, respectively, using a filter cube 340. Images can be captured using a cooled CCD camera 350 with a 1300×1030 CCD pixel array with square pixels, 6.7 μm on edge, and 12-bit digitization.

Utilizing the system 300 of FIG. 3, it has been observed that, within 2 s of the application of the A/C field, the flow becomes unstable and transverse velocities in the flow quickly stretch and fold material lines. The EKI occurs throughout the 7-mm channel length. Pressure-driven bulk flow occurs from right to left. The application of the A/C field resulted in a rapid deformation of the initial seeded/unseeded fluid interface. As can be seen with reference to FIGS. 7 and 8, the random redistribution of the flow tracer transverse to the applied A/C field is evident. Such instability can be initiated along with a D/C electroosmotic flow, with pressure-driven flow or with zero net flow through the channel in "stopped-flow" mode.

Figure 4:
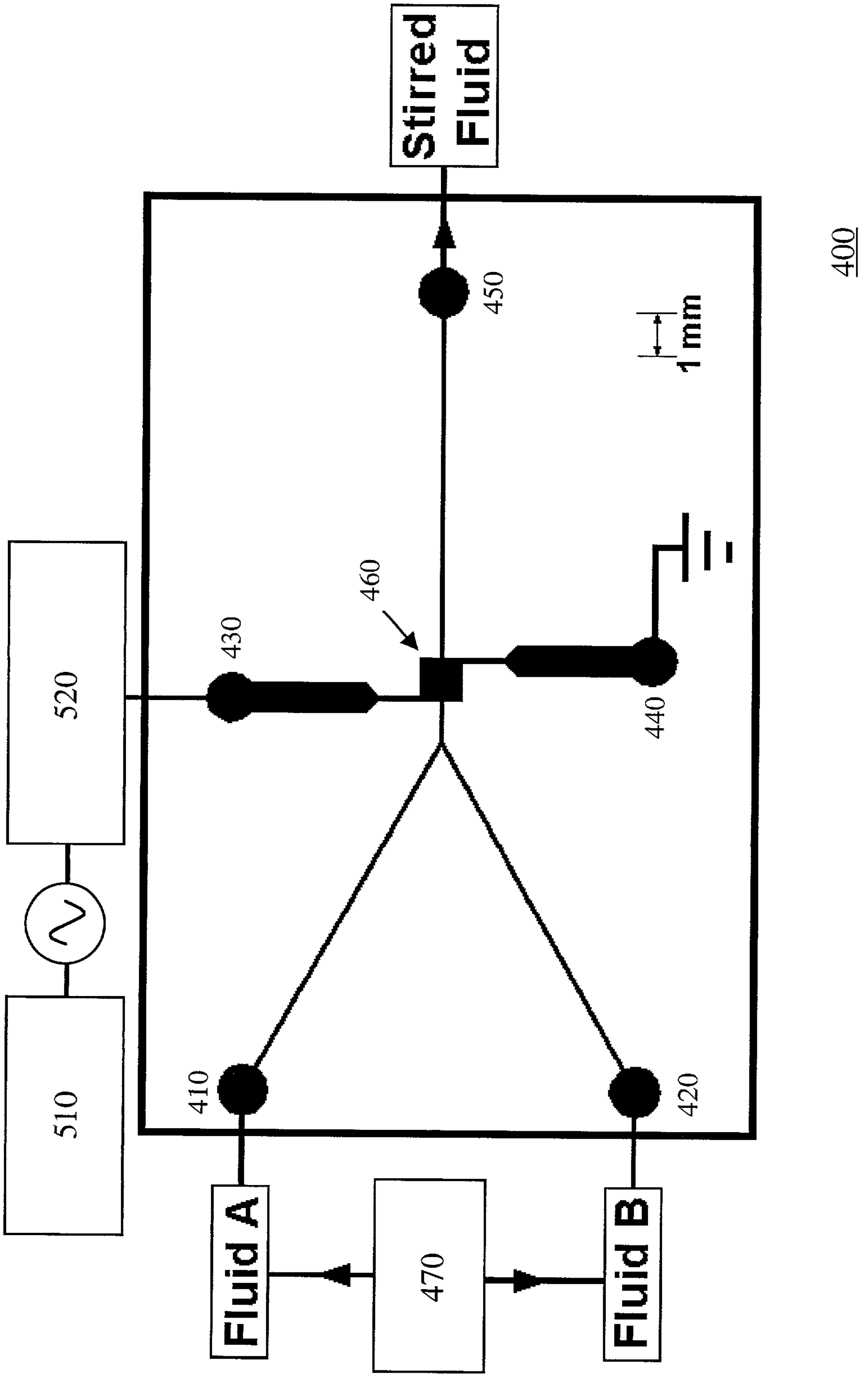
FIG. 4 illustrates a preferred embodiment of the present invention.

FIG. 4 illustrates a preferred embodiment of an EKI micromixer 400. The novel EKI micromixer 400 is a robust and practical micromixing device capable of stirring a smaller fluid volume either continuously or intermittently. According to an aspect of the invention, the width and depth of the microchannel is 300 μm by 100 μm, respectively. The mixing chamber is 1 mm×1 mm×100 μm which comprises a 0.1-μL volume. The EKI micromixer 400 according to FIG. 4 is an entirely two-dimensional structure fabricated using two borofloat glass substrates such as those by Precision Glass & Optics. Standard photolithography and wet-etching processes can be used for the microfabrication.

According to an aspect of the present invention, a 20-nm chrome layer followed by a 100-nm layer of gold are deposited onto a first borofloat glass substrate. A Mylar mask, Shipley S1813 photoresist, and chrome/gold etchants can be used to pattern the etch mask. The fluidic network of FIG. 4 is etched to a depth of 100 μm using pure HF (49%) for ~15 min. In this relatively deep etch process, porosity in the etch mask resulted in some micropitting of the substrate surface, external to the microchannels. The final channel surfaces had roughness elements of about 1–2 μm. After etching, 1-mm-diameter thru holes are correspondingly drilled through the cover substrate using diamond-tipped drill bits. The fluidic network is sealed by thermally bonding a second borofloat substrate to the etched substrate at 650° C. for 90 min.

According to some design principles of the present invention, the instability is to be largely confined to the mixing chamber and the input flow streams are to be driven by either pressure or electric fields. To achieve these goals, the inventive EKI micromixer incorporates electrical connections with high flow resistance that mechanically isolate the liquid in the external liquid reservoirs from the liquid in the micromixer chamber. Location of the electrodes in buffer reservoirs and isolation of the well from the microchannels using the frits is an effective and robust method for active mixing with an off-chip power source. These electrically conductive, high fluidic resistance connections are preferably porous, dielectric frits with 0.5-μm pores such as those by Upchurch Scientific, Oak Harbor, Wash. This novel design can be easily disassembled for frit replacement and is robust to the effects of electrolysis gases produced in the reservoirs.

Referring to FIG. 4, two fluids are introduced via a syringe pump 470 into the inlet ports 410 and 420 and advected either eletroosmotically or with pressure toward the square mixing chamber 460. Side channel ports 430 and 440, connected to either side of the mixing chamber 460, allow for A/C excitation.

During operation of the mixer, the region of instability and rapid stirring is confined to the mixing chamber 460 and does not penetrate more than two channel widths into the inlet or outlet regions of the main flow channel. Molecular diffusion continues the mixing process while the stirred fluid is advected downstream from the mixing chamber toward outlet port 450.

Figure 5:
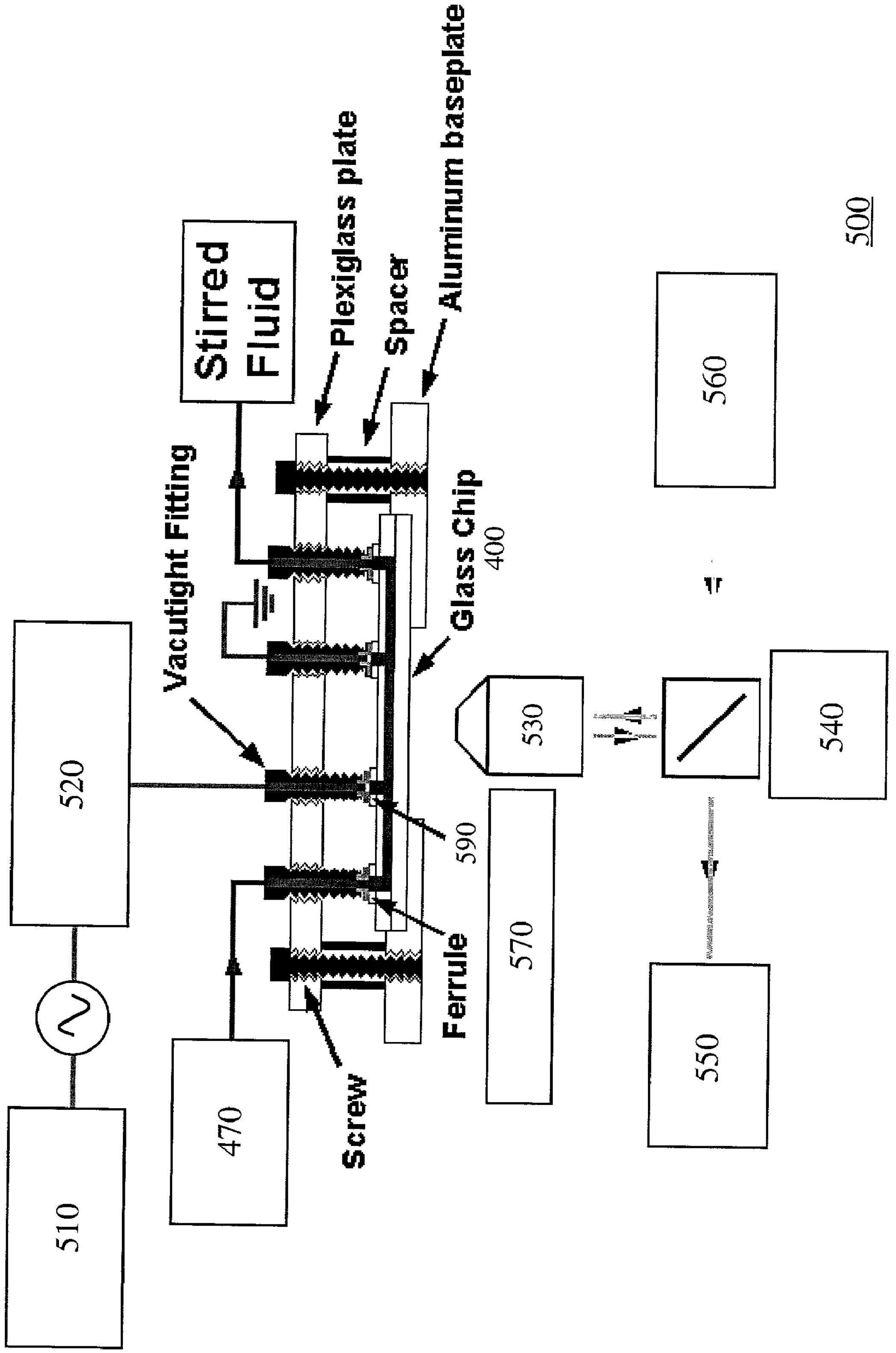
FIG. 5 is a schematic of a system set up according to another aspect of the present invention.

FIG. 5 illustrates a system 500 for monitoring and analyzing the performance of the EKI micromixer 400 of FIG. 4. The A/C field is created with a sine wave from a function generator 510 fed into a high-voltage (0 to ±10 kV) amplifier 520. Platinum electrodes (not shown) are utilized to apply a voltage and frequency of 4 kV and 5 Hz. Ferrule frits 590 are added externally to the A/C side ports 430 and 440. The measured impedance of the frits in system 500 is nonnegligible and is measured to be ~2 mΩ under the conditions disclosed here.

In an embodiment, a syringe pump 470 dispenses 0.5 μL/min flow rates into each of the liquid inlet ports 410 and 420. Fluids streams A and B consisted of a 5 mM HEPES buffer, with fluid B dyed with a 20 μM fluorescein solution. The measured electrical conductivities are 160 and 190 μS/cm for the undyed and dyed buffers, respectively. This buffer is chosen in order to minimize the effects of Joule heating in the mixing chamber.

Imaging of dye fluorescence can be accomplished using an inverted, epifluorescent microscope 530, a 100-W mercury lamp 560, a 4× or 10× objective 570, and a cooled 12-bit CCD camera 550 with a 1300×1030 CCD pixel array of square pixels, 6.7 μm on edge. An XF23 filter cube 540 such as one manufactured by Omega Optical, Inc. can be used. The object-plane voxel dimensions correspond to the pixel area projected onto the object plane.

Figure 6:
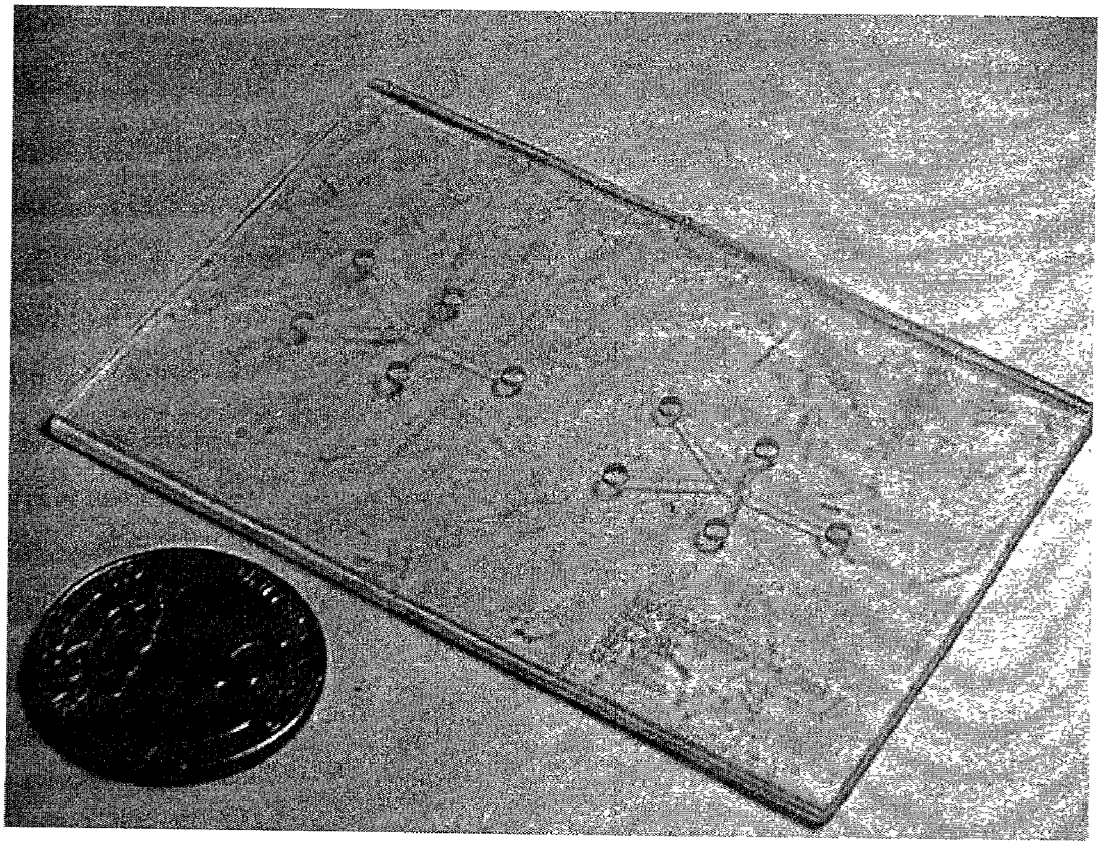
FIG. 6 is an image showing dual EKI micromixers on a single substrate, according to an embodiment of the present invention.

FIG. 6 is an image displaying two EKI micromixers fabricated on a 2×3 in. glass substrate. The EKI mixers are wet-etched together in a borosilicate glass substrate and thermally bonded to a second borosilicate glass substrate to seal the fluidic network. The randomly fluctuating, three-dimensional velocity field created by the flow instability is capable of rapidly stirring fluid volumes smaller than the size of a pinhead (0.5 $mm^3$).

Figure 7:
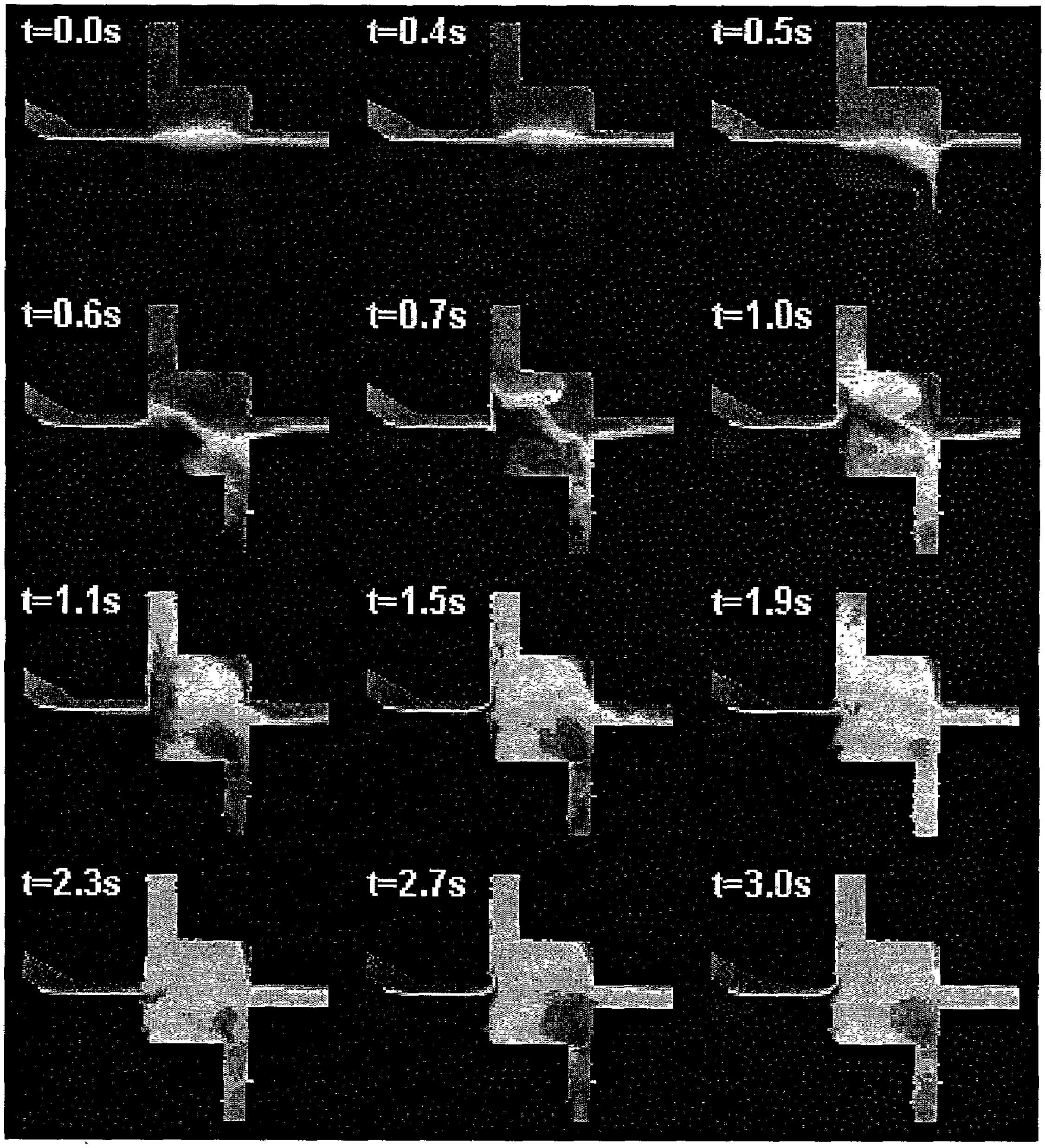
FIG. 7 is a picture of 4× objective images showing the operation of a preferred embodiment.

FIG. 7 is a picture of image showing a preferred EKI micromixer in operation. 4× objective images taken from the square mixing chamber, including portions of the inlet, exit, and side excitation channels, show that dyed and undyed fluids enter the chamber and are rapidly stirred upon application of the A/C field at t=0.5 s. After 2.5 s, the dye is uniformly distributed throughout the mixing chamber and the well-stirred dye exits. Once the mixing chamber fluid is well stirred, the output stream of the mixer shows approximately homogeneous fluorescence intensity. The images also show the rapid stretching and folding of the passive flow tracer.

Figure 8:
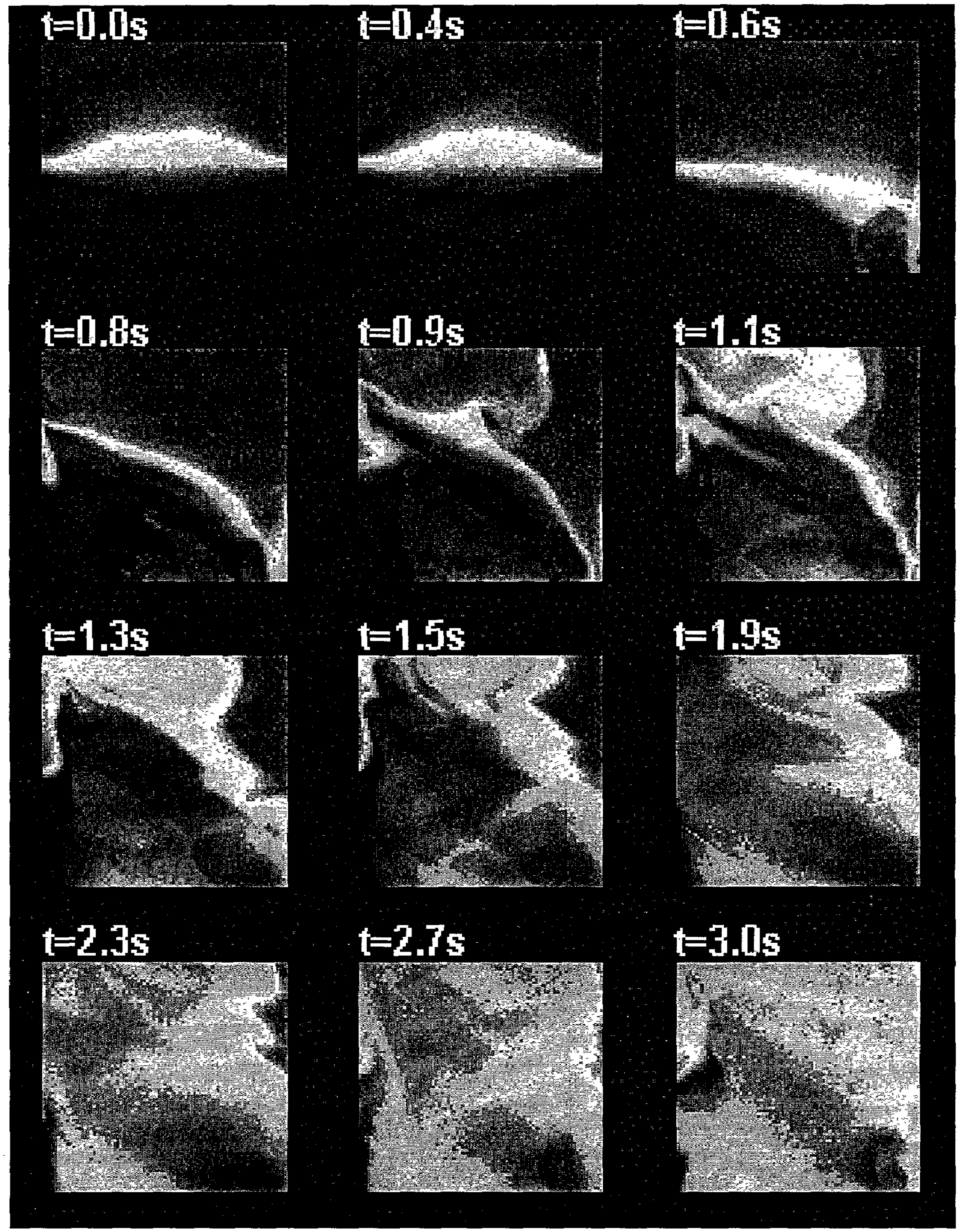
FIG. 8 is a picture of 10× objective images showing rapid mixing within a mixing chamber according to a preferred embodiment of the present invention.

FIG. 8 is a picture of 10× objective images showing the EKI stirring within the mixing chamber of a robust EKI micromixer. The bulk-averaged velocity in the channel and mixing chamber are 0.5 and 0.16 mm/s, respectively. The Reynolds number based on channel depth and rms electroosmotic velocity is 1.5 and the Stokes' penetration depth is 250 μm. Again, the time sequence of images clearly shows the rapid stirring dynamics associated with the EKI.

Note the transport associated with the stirring motion of the instability has a high ratio of advective to diffusive flux and the stirring generates high spatial frequency gradients as new, undiffused fluid interface lengths are generated in the flow. This ratio of advective to diffusive fluxes is typically quantified in terms of a Peclet number. Peclet number, UL/D, based on 1-mm chamber dimension and the rms base state velocity, is of order 30,000, where D is the molecular diffusivity of the dye. Mixing, i.e., diffusion and stirring, of the scalar to a scale less than the scales of the imaged voxels quickly damps the high-frequency concentration gradients after sufficient reduction of the mixing length. In addition to the magnitude of frequency components, the isotropy of power spectra is also a measure of mixing. The intermediate, randomly stirred states of EKI show strongly anisotropic spectra, while the well-stirred state spectra are isotropic.

In conclusion, the ability to rapidly mix fluids at low Reynolds numbers is critical to the functionality of many bioanalytical, microfluidic devices. Utilizing a flow instability in electroosmotic microflows driven with sinusoidally alternating electric fields, novel EKI micromixing devices and methods have been presented. The EKI micromixers according to the present invention can be visualized with both submicrometer tracer particles and fluorescent dye concentration fields.

At relatively low frequencies (below ~100 Hz), electric field strengths in excess of 100 V/mm, and channel geometries greater than ~50 μm, a departure from the parallel flow of the stable, reciprocating electrokinetic flow base state occurs. In the case of particle visualizations in long straight channels, particles in the unstable field are observed to have three-dimensional motions. In the scalar visualizations, high-concentration regions of injected dyes are rapidly stretched and folded and dye is dispersed within the flow channel.

The present invention advantageously utilizes electrokinetic flow instability that occurs at Reynolds numbers as low as order unity to effect rapid mixing in microchannels. Such instability has been observed to occur in a variety of channel substrates including PDMS, PMMA, and glass. Design of mixer geometry with electrode wells within 1 mm of the mixing chamber can be used to reduce the required voltages to less than 1 kV. The time scale required for the fluids to become mixed to within the scale of the voxels is reduced by ~2 orders of magnitude for the mixtures studied here. Various electrolytes including deionized water and borate and HEPES buffers, with electrical conductivities ranging from 5 to 250 μS/ cm have been used. The EKI micromixer devices and systems presented herein clearly show the applicability of the EKI to stirring in on-chip microfluidic systems.

According to the principles of the present invention, rapid electrokinetic stirring can be achieved in the novel EKI micromixer in a "stopped-flow" or continuous-flow mode where the throughput of sample streams is actuated by either pressure or electroosmotic forces. According to some embodiments of the present invention, the EKI can occur with an electroosmotic flow, a pressure-driven flow, or a flow field with no net flow rate, all with a Reynolds number less than 1.5.

A preferred embodiment has been presented to implement the inventive rapid stirring mechanism in a more robust device requiring no moving parts. An instability in the flow is generated within a mixing chamber within a few seconds after application of an A/C electric field. The observed breakdown of laminar flow is characterized by an unsteady, random nature of the flow field, which are not present under simple laminar flow conditions, effectively stir the solution, thereby causing a significant reduction in the diffusion length and time necessary for molecular diffusion.

The present invention can be realized in a variety of microchannel dimensions, geometries, and materials, and has specific field strengths and frequencies over which it is most effective. The scheme can be used along with a steady (D/C) electric field for electroosmotic transport, with pressure-drive flows, and with systems of no net flow (e.g., as in a stopped-flow mixer). The generation of a complex flow in this manner can have wide applications in both miniaturized and meso-scale bioanalytical systems such as immunoassay systems, drug reconstitution systems, combinatorial chemistry systems, enzyme assay systems, and any other system in which low diffusivity species are mixed. The present invention also has the potential for micron-scale heat transfer enhancement schemes such as microelectronics cooling. Furthermore, the present invention provides enabling technology to improve "Lab-on-a-Chip" designs in that rapid stirring necessary for testing biochemical substances in laboratories can now be performed on a chip the size of a credit card in a simple, practical, and cost-effective way. The EKI micromixer may be used for a variety of general on-chip binding assays where solutions containing ligans and receptors are to be rapidly stirred. Types of assays include general antibody/antigen and general enzyme/inhibitor. Molecules of interest include amino acids, organic molecules, glucose, etc. The EKI micromixer may also aid chemical synthesis requiring rapid stirring. The present invention is therefore particularly useful in genetics, drug research, clinical analysis, biomolecular, chemical, and biochemical fields.

These and other advantages allow the novel micromixer designs presented herein to be incorporated into a single-layer microfabricated fluidic system with only minor modifications to a lithographic mask and the addition of external connections for electrodes. The present invention can thus be easily integrated into existing single-layer microfluidic chips with little or no additional fabrication requirements other than simple mask layout changes.

Although the present invention and its advantages have been described in detail, it should be understood that various changes, substitutions, and alternations could be made and/or implemented without departing from the principles and the scope of the invention. Accordingly, the scope of the present invention should be determined by the following claims and their legal equivalents.

We claim:

1. An electrokinetic stirring method for rapid mixing of an initially heterogeneous solution whose motion is dominated by viscous forces, said method comprising the acts of:

providing a fluidic network having a plurality of ports including at least two inlet ports and one outlet port, and a plurality of liquid channels connecting said plurality of ports;

positioning two electrodes into ends of said liquid channels wherein said ends also act as inlet and outlet ports for said fluidic network;

introducing small volume liquid streams into said fluidic network via said inlet ports wherein said liquid streams are characterized as confluent and wherein said confluent liquid streams form said initially heterogeneous solution;

introducing an alternating current (A/C) electric field into said fluidic network via said electrodes; and inducing an electrokinetic flow instability (EKI) in said initially heterogeneous solution with said A/C electric field, wherein said EKI, generated within a few seconds after application of said A/C electric field, essentially confined to a mixing chamber, and acting as an active stirring means, quickly produces a randomly fluctuating, three-dimensional fluid flow field enabling said rapid mixing thereby generating a homogeneous solution from said initially heterogeneous solution.

2. The method of claim 1, wherein said A/C electric field is directed axially along one of said liquid channels parallel to a confluent flow direction of said liquid streams.

3. The method of claim 1, wherein said liquid channels further comprise at least two side channels with corresponding side channel ports, and wherein either side of said mixing chamber has said side channels connected thereto, said method further comprising the acts of:

positioning electrodes into said side channel ports; and applying said A/C electric field via said electrodes, wherein said A/C electric field is directed along said side channels.

4. The method of claim 3, further comprising acts of:

providing each of said side channels with a high flow resistance, porous, dielectric membrane that mechanically isolates said initially heterogeneous solution, prevents electrolysis bubbles from passing through or otherwise disturbing the liquid in the mixing chamber, and provides an ionic connection allowing passing of said A/C electrical field such that said rapid mixing can be achieved without effects of flow motions and electrolysis gases.

5. The method of claim 3, wherein said liquid streams are advected either electroosmotically or with pressure toward said mixing chamber.

6. The method of claim 1, wherein said rapid mixing is achieved continuously or intermittently where throughput of said liquid streams is actuated by either pressure or electroosmotic forces.

7. The method of claim 1, wherein said liquid streams are advected either electroosmotically with a steady (D/C) component simultaneously added to said A/C electric field or by pressure-source means including a hydrostatic head, gas-pressurized liquid reservoirs, syringe pumps, or micropumps.

8. The method of claim 1, further comprising an act of:

incorporating electrically conductive, porous, high flow resistance means to prevent flow motions and electrolysis gases from affecting said rapid mixing while providing an electric connection to facilitate said rapid mixing.

9. The method of claim 1, further comprising an act of:

pulse modulating between said A/C electric field effecting said EKI and a steady (D/C) electric field effecting electroosmotic transport.

10. The method of claim 1, further comprising an act of:

adding a steady (D/C) component simultaneously to said A/C electric field for effecting electroosmotic transport.

11. The method of claim 1, further comprising an act of:

providing at least one pressure-source means for effecting advection, wherein said pressure-source means includes a hydrostatic head, a gas-pressurized liquid reservoir, a syringe pump, or a micropump.

12. The method of claim 1, wherein said homogeneous solution is generated from a fixed volume of said initially heterogeneous solution without net flow.

13. The method of claim 1, wherein said initially heterogeneous solution comprises low diffusivity species including macromolecules, biological cells, or both.

14. The method of claim 1, further comprising an act of:

incorporating a monitoring means for analyzing and monitoring performance of said rapid mixing.

15. An electrokinetic instability (EKI) micromixer, comprising:

a fluidic network having a mixing chamber;

a plurality of ports including at least two inlet ports, at least two side channel ports, and an outlet port;

a plurality of liquid channels connecting said mixing chamber and said plurality of ports;

at least two high flow resistance, porous, dielectric membranes; and an alternating current (A/C) voltage source for applying an A/C electric field via said channel ports, wherein during operation of said EKI micromixer said A/C electric field induces an electrokinetic flow instability (EKI) to effect rapid mixing of an initially heterogeneous solution in said mixing chamber, thereby generating a homogeneous solution from said initially heterogeneous solution.

16. The EKI micromixer of claim 15, further comprising:

electrically conducting means positioned in said side channel ports for facilitating application of said A/C electric field.

17. The EKI micromixer of claim 15, wherein said high flow resistance, porous, dielectric membranes are externally attached to said side channel ports for mechanically isolating fluids in said EKI micromixer to prevent flow motions and electrolysis gases from affecting said rapid mixing while providing an ionic connection allowing passing of said A/C electric field.

18. The EKI micromixer of claim 15, further comprising:

a modulating means for pulse modulating between an A/C electric field effecting said EKI and a steady (D/C) electric field effecting electroosmotic transport.

19. The EKI micromixer of claim 15, further comprising:

a direct current (D/C) source means for providing a steady D/C component that is simultaneously added to said A/C electric field for effecting advection towards said mixing chamber.

20. The EKI micromixer of claim 15, wherein said rapid mixing has a continuous or intermittent mode driven by either pressure or electroosmotic forces.

21. The EKI micromixer of claim 15, further comprising:

at least one pressure-source means for effecting advection towards said mixing chamber.

22. The EKI micromixer of claim 21, wherein said at least one pressure-source means includes a hydrostatic head, a gas-pressurized liquid reservoir, a syringe pump, or a micropump.

23. The EKI micromixer of claim 15, wherein said homogeneous solution is generated from a fixed volume of said initially heterogeneous solution without net flow.

24. The EKI micromixer of claim 15, wherein said initially heterogeneous solution comprises low diffusivity species including macromolecules, biological cells, or both.

25. The EKI micromixer of claim 15, further comprising:

an optically accessible means for allowing analyzing and monitoring performance of said rapid mixing.

26. The EKI micromixer of claim 15, wherein said EKI micromixer is characterized as requiring no moving parts and is part of a single microfluidic chip utilized in a bioanalytical system.

* * * * *